US011146595B2

(12) United States Patent
Jahangir et al.

(10) Patent No.: US 11,146,595 B2
(45) Date of Patent: Oct. 12, 2021

(54) SERVICE-BASED IP MULTIMEDIA NETWORK SUBSYSTEM (IMS) ARCHITECTURE

(71) Applicant: T-Mobile USA, Inc., Bellevue, WA (US)

(72) Inventors: Zeeshan Jahangir, Snoqualmie, WA (US); Umair Rehmat, Redmond, WA (US); Shujaur Mufti, Snoqualmie, WA (US); Christopher H. Joul, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/740,144

(22) Filed: Jan. 10, 2020

(65) Prior Publication Data

US 2020/0344274 A1  Oct. 29, 2020

Related U.S. Application Data

(60) Provisional application No. 62/838,160, filed on Apr. 24, 2019.

(51) Int. Cl.
*G06F 15/16* (2006.01)
*H04L 29/06* (2006.01)
*H04L 29/08* (2006.01)

(52) U.S. Cl.
CPC ...... *H04L 65/1016* (2013.01); *H04L 65/1006* (2013.01); *H04L 65/1069* (2013.01); *H04L 67/02* (2013.01); *H04L 67/142* (2013.01)

(58) Field of Classification Search
CPC ............. H04L 65/1006; H04L 65/1016; H04L 65/1069; H04L 67/02; H04L 67/142
See application file for complete search history.

(56) References Cited

U.S. PATENT DOCUMENTS

| 10,264,413 | B1 | 4/2019 | Bogineni et al. |
| 2006/0187901 | A1 | 8/2006 | Cortes et al. |
| 2011/0151871 | A1* | 6/2011 | Naqvi ................. H04L 12/2876 455/435.1 |
| 2020/0221518 | A1* | 7/2020 | Schmitz ............... H04L 41/147 |
| 2020/0394246 | A1* | 12/2020 | Shribman ........... H04L 63/1466 |

OTHER PUBLICATIONS

The Extended European Search Report dated Jun. 24, 2020 for European Application No. 20168572.4, 8 pages.

* cited by examiner

*Primary Examiner* — Yves Dalencourt
(74) *Attorney, Agent, or Firm* — Lee & Hayes, P.C.

(57) ABSTRACT

A service-based architecture (SBA) IP Multimedia Network Subsystem (IMS) network exposes Network Functions (NFs) to nodes within a 5G core network (CN), nodes within the SBA IMS network, and/or nodes within another network. In contrast to the SBA IMS network, legacy IMS networks are non-SBA IMS stateful networks that may utilize the Session Initiation Protocol (SIP). Utilizing the SBA IMS network, a node in the 5G core network can communicate directly with any node in the SBA IMS network. The SBA IMS network is stateless and open as opposed to stateful and closed as in SIP based legacy IMS networks. In some configurations, the SBA IMS network utilizes a HyperText Transfer Protocol (HTTP). For instance, instead of using the application layer SIP protocol, techniques can include using HTTP. The SBA IMS may also connect to legacy SIP IMS networks.

17 Claims, 6 Drawing Sheets

SERVICE-BASED IP MULTIMEDIA NETWORK SUBSYSTEM (IMS) ARCHITECTURE

RELATED APPLICATIONS

This application claims the benefit of priority to provisional U.S. Patent Application Ser. No. 62/838,160, filed on Apr. 24, 2019, and entitled "Enhanced Service-Based IMS Architecture", which is incorporated by reference in entirety.

BACKGROUND

Modern terrestrial telecommunication systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. Moving forward, future telecommunications systems may include fifth generation (5G) cellular-wireless access technologies to provide improved bandwidth and decreased response times to a multitude of devices that may be connected to a network.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
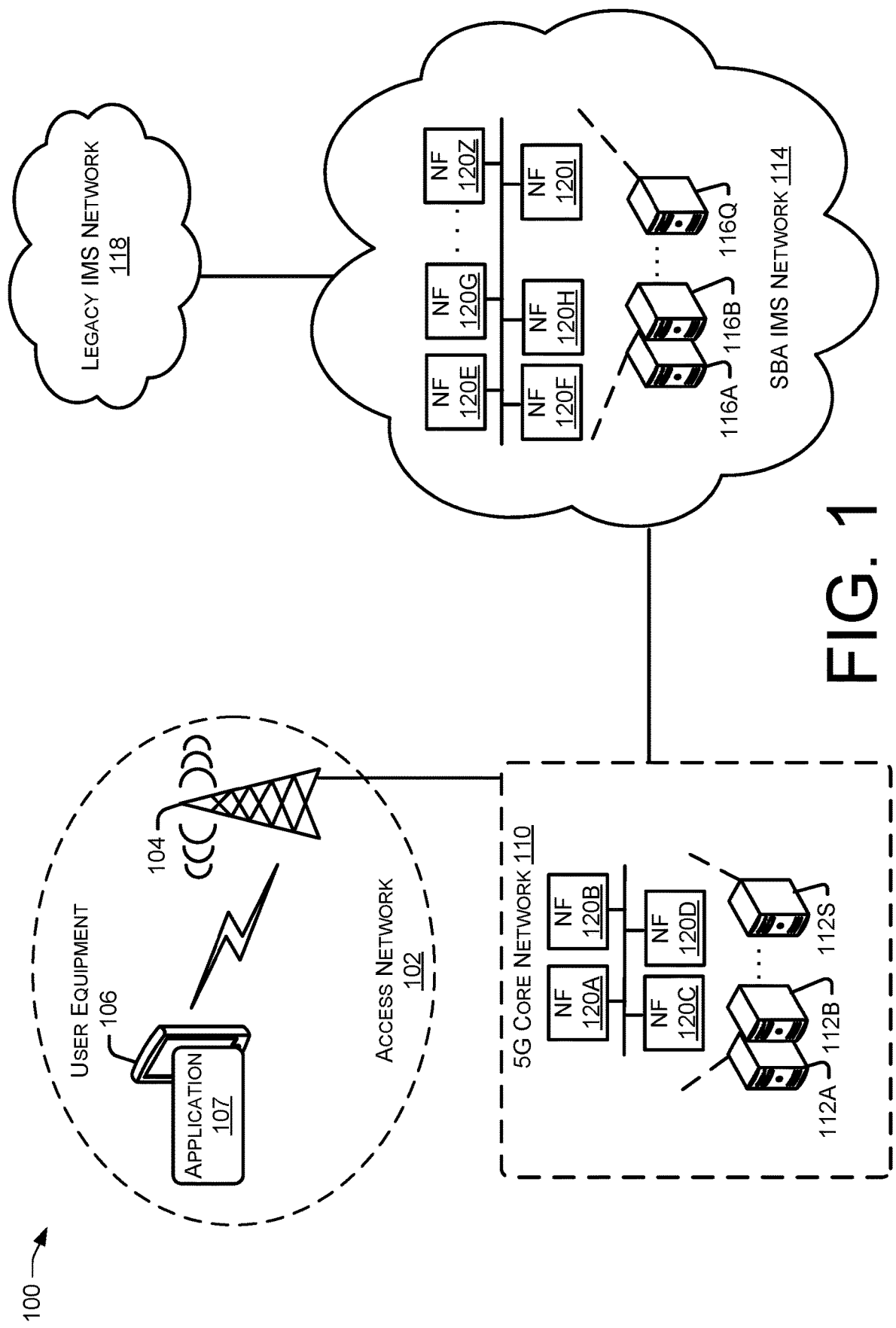
FIG. 1 is a block diagram showing an illustrative environment that utilizes a service-based architecture (SBA) IP Multimedia Network Subsystem (IMS) network.

Described herein are techniques and systems relating to an enhanced, service-based architecture (SBA) IP Multimedia Network Subsystem (IMS) network. Using techniques described herein, an SBA IMS network exposes Network Functions (NFs) to nodes within a 5G core network (CN), nodes within the SBA IMS network, and/or nodes within some other network.

Current IMS networks (which may be referred to herein as "legacy IMS networks") are non-SBA IMS stateful networks that may utilize the Session Initiation Protocol (SIP). SIP is a signaling protocol used for initiating, maintaining, and terminating real-time sessions that include voice, video and messaging applications. These legacy IMS networks that utilize SIP do not follow a SBA. Generally, a SBA provides different services that may be accessed and utilized directly by different nodes. Instead of utilizing a SIP based legacy IMS network, the current techniques described herein utilize an SBA IMS that exposes NFs and services directly to other nodes.

Utilizing the SBA IMS network, a node, such as a device in the 5G core network, can communicate directly with any node in the SBA IMS network. For example, instead of a node within the 5G core network having to first contact a particular service node within a SIP based IMS network to access a particular service provided by another node, the node within the 5G CN can directly access the node providing the service using a standard Application Programming Interface (API). Similarly, a node, such as a node in the SBA IMS network, can communicate with any node in the 5G CN. Stated another way, the SBA IMS network is stateless and open as opposed to stateful and closed as in SIP based legacy MS networks.

In some configurations, the SBA IMS network utilizes a Hypertext Transfer Protocol (HTTP). For instance, instead of using the application layer SIP protocol, the SIP protocol is replaced with HTTP. Generally, HTTP is a more lightweight protocol compared to SIP. The SBA IMS may also connect to legacy SIP IMS networks.

The SBA IMS network discussed herein may provide benefits over legacy IMS networks. For example, the SBA IMS network can take advantage of functionality provided by SBA 5G CNs. The SBA IMS network may be more lightweight and open compared to legacy IMS networks. In some examples, an outside entity (e.g., a node in the 5G Core Network, and/or a node in another network) can communicate directly with a node in the SBA IMS network. Further, the SBA IMS network may be simpler, and more streamlined compared to legacy IMS network architectures. The SBA IMS network and the 5G CN may also be derived from common NFs and/or services between the SBA IMS network and the 5G CN since they are both SBAs. According to some implementations, authentication and call session procedures may also be simplified resulting in reduced signaling. Additionally, new NFs introduced within the SBA IMS network may be configured to host multiple services which may be consumed by NFs within the SBA IMS network, the 5G CN, and/or other networks.

The systems, devices, and techniques described herein can improve a functioning of a network by providing an architecture to expose NFs within an SBA IMS network. For example, using the techniques described herein nodes may communicate directly with one another using a stateless architecture. Further, networks may share common functionality. For examples, nodes within a 5G CN may utilize functionality within the SBA IMS network, and nodes within the SBA IMS network may utilize functionality within the 5G CN. These and other improvements to the functioning of a computer and network are discussed herein. More details are provided below with reference to FIGS. 1-6.

FIG. 1 is a block diagram showing an illustrative environment 100 that utilizes an SBA IMS network 114. The environment 100 may include an access network 102, a 5G core network 110, an SBA IMS network 114, and a legacy IMS network 118 that is associated with a wireless service provider(s). The environment 100 is illustrated in simplified form and may include many more components.

The environment 100 may include cells, such as cell 104, that may be wireless or wired that are coupled to 5G core network 110 and/or some other network. The environment 100 may also include one or more access points (not shown), and one or more gateways (not shown). A cell, such as cell 104, may handle traffic and signals between electronic devices, such as the user equipment 106, and 5G CN 110. For example, a cell 104 may perform the transcoding of speech channels, allocation of radio channels to electronic devices, paging, transmission and reception of voice and data, as well as other functions. A cell 104 may include several base transceiver stations (BTS), each BTS may include a transceiver, antenna, and additional network switch and control equipment that provide a network cell for facilitating wireless communication between UE computing devices and the core network 110 and/or other networks. In some examples, the cells 104 may include a gNodeB and/or an eNodeB.

The user equipment 106, which may also be referred to herein as "user endpoint (UE)", are computing devices that can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data using a cellular access network 102, and/or over a Wi-Fi network, or some other type of network. In some instances, the UE 106 computing devices can be configured to send and receive data using any wired or wireless protocols. Additional examples of the UE 106 include, but are not limited to, smart devices such as televisions, music players, or any other electronic appliances that can generate, request, receive, transmit, or exchange voice, video, and/or digital data over a network. In some examples, the UE 106 is configured to communicate with 5G CN 110, and/or other cellular networks. The UE 106 can further be configured to establish or receive a communication session, such as a voice call, a video call, or another sort of communication.

In some configurations, one or more nodes, such as nodes 112 illustrated in 5G CN 110 and/or nodes 116 illustrated in SBA IMS network 114 may be configured as one or more application servers that provide support for one more applications, such as application 107 utilized by one or more computing devices, such as UE 106. Some example applications include, but are not limited to browser applications, messaging applications, voice applications (e.g., Voice over Internet Protocol "VoIP" applications), video applications, and the like.

While the nodes 112 are illustrated within the 5G CN 110 and nodes 116 are illustrated in SBA IMS network 114, one or more other computing devices may be located outside of these networks. For example, an application server, or some other server or device, may be connected to a network via one or more external packet switched networks, such as the Internet.

According to some configurations, a telephony client application, such as application 107, on the UE 106 may establish data communication with the network 110 through a data connection to the cell 104. The cell 104 may route a communication wired/wirelessly from the UE 106 through the access network 102 for communication to the 5G CN 110. In general, a cell 104 can be implemented as a variety of technologies to provide wired and/or wireless access to the network, as discussed herein. In some instances, the cell 104 can include a New Radio (5G) RAN, a 3GPP RAN, such a GSM/EDGE RAN (GERAN), a Universal Terrestrial RAN (UTRAN), an evolved UTRAN (E-UTRAN), or alternatively, a "non-3GPP" RAN, such as a Wi-Fi RAN, or another type of wireless local area network (WLAN) that is based on the IEEE 802.11 standards. Further, the cell 104 can include any number and type of transceivers and/or base stations representing any number and type of macrocells, microcells, picocells, or femtocells, for example, with any type or amount of overlapping coverage or mutually exclusive coverage.

When a communication request arrives at the network 110, one or more of the nodes 112 may determine the identity of the originating computing device for the communication (e.g., using a telephone number, IMEI, IMSI, IP address) as well as the identity of the computing devices to send the communication. In some configurations, one or more of the nodes 116 may be utilized to determine the identity of the originating computing device for the communication as well as the identity of the computing devices to send the communication. The one or more of the nodes 112, 116 may also identify that the UE 106 is communicating using a stateless protocol that is associated with a SBA or a stateful protocol (e.g., SIP) that is associated with a non-SBA. According to some configurations, a UE 106 may connect to the service nodes 112, or some other component such as an application server, via the Internet (not illustrated).

As illustrated, the environment 100 includes one or more servers, including nodes 112 and 116, to facilitate communications by and between the various devices in the environment 100 and perform operations relating to utilizing the SBA IMS network 114, the legacy IMS network 118, and/or other networks. That is, environment 100 can include any computing devices implementing various aspects of one or more of second, third, fourth generation, and fifth generation (2G, 3G, 4G, and 5G) cellular-wireless access technologies, which may be cross-compatible and may operate collectively to provide data communication services. Global Systems for Mobile (GSM) is an example of 2G telecommunications technologies; Universal Mobile Telecommunications System (UMTS) is an example of 3G telecommunications technologies; and Long-Term Evolution (LTE), including LTE Advanced, Evolved High-Speed Packet Access (HSPA+) are examples of 4G, and 5G NR is an example of 5G telecommunications technologies. Thus, the environment 100 may implement GSM, UMTS, LTE/LTE Advanced, and/or 5G NR telecommunications technologies.

The environment 100 may include, but is not limited to, a combination of: base transceiver stations BTSs (e.g., NodeBs, Enhanced-NodeBs, gNodeBs), Radio Network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), an Internet Protocol (IP) Multimedia Subsystem (IMS), or any other data traffic control entity configured to communicate and/or route data packets between the UE 106, and one or more endpoints within the environment 100 (e.g., nodes 112A-112S that provide network functions (NFs) 120A-120D, nodes 16A-116Q that provide NFs 120E-120I, websites, etc.). While FIG. 1 illustrates an example environment 100, it is understood in the context of this document, that the techniques discussed herein may also be implemented in other networking technologies.

As briefly discussed above, the SBA IMS network 114 exposes Network Functions (NFs), such as NFs 120E-120Z, to nodes within a 5G CN, nodes within the SBA IMS network, and/or nodes within some other network. As illustrated, the 5G CN exposes NFs 120A-120D. The SBA IMS network 114 may also be coupled to a legacy IMS network 118. The legacy IMS network 118 is a non-SBA stateful network that may utilize SIP. In contrast to the legacy IMS network 118, the SBA IMS network 114 provides services and NFs that may be accessed and utilized directly by different nodes.

Utilizing the SBA IMS network 114, a node, such as a node in the 5G CN 110, can communicate directly with any node in the SBA IMS network 114. For example, instead of a node within the 5G CN 110 having to first contact a particular service node within the legacy IMS network 118 to access a particular service, the node within the 5G CN 110 can directly access the node within SMS IMS network 114 that provides the service. In some examples, the nodes utilize a standard Application Programming Interface (API) to communicate. Similarly, a node, such as a node in the SBA IMS network 114, can communicate with any node in the 5G CN 110 since the SBA IMS network is stateless and open as opposed to stateful and closed as in the SIP based legacy IMS network 118. In some configurations, the SBA IMS network 114 utilizes HTTP instead of SIP as utilized by the legacy IMS network 118. Generally, HTTP is more lightweight compared to SIP.

The SBA IMS network 114 may take advantage of functionality provided by SBA 5G CN 110. For instance, a node in the SBA IMS network 114 may communicate directly with a node in the 5G CN 110 and a node in the 5G CN 110 may communicate directly with a node in the SBA IMS network 114. Further, in some examples, the SBA IMS network 114 and the 5G CN 110 can be derived from common NFs and/or services between the SBA IMS network 114 and the 5G CN 110 since these networks are both SBAs. According to some implementations, authentication and call session procedures may also be simplified resulting in reduced signaling.

Additionally, new NFs introduced within the SBA IMS network 110 may be configured to host multiple services which may be consumed by NFs within the SBA IMS network 114 and the 5G CN 110. More details are provided below with regard to FIGS. 2-6.

Figure 2:
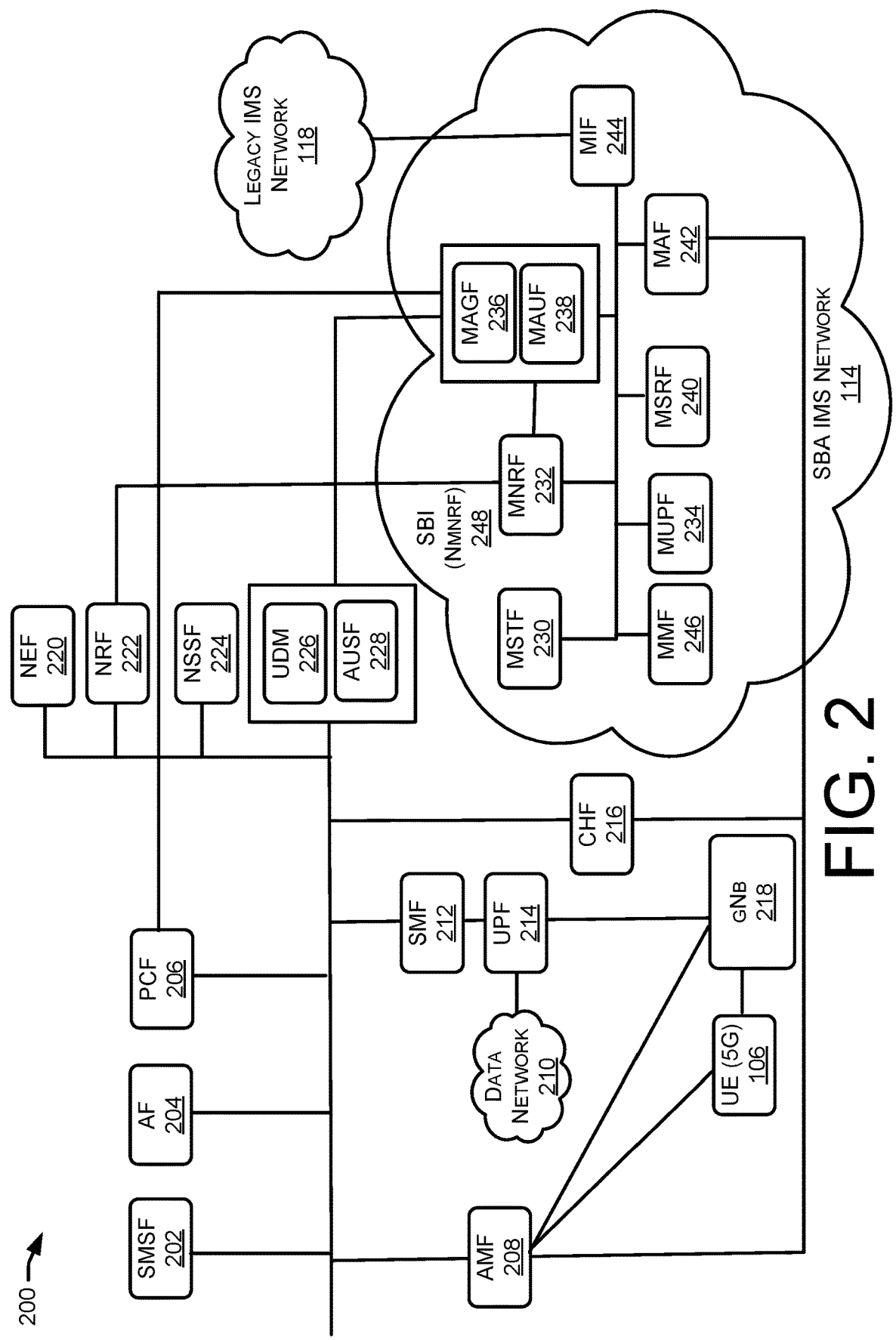
FIG. 2 is a block diagram showing an illustrative environment including a 5G core network, an SBA IMS network, and a legacy IMS network.

FIG. 2 is a block diagram showing an illustrative environment 200 including a 5G CN 110, an SBA IMS network 114, and a legacy IMS network 118. The environment 200 illustrates additional details (compared to FIG. 1) on exemplary NFs exposed by SBA IMS network 114 and 5G CN 110. As discussed above, an exposed NF may be accessed directly by different nodes within the 5G CN 110, an SBA IMS network 114, and/or some other network.

According to some configurations and as described herein, the SBA IMS network 114 is a stateless based architecture in which common network functions (NFs) are exposed between the SBA IMS network 114 and the 5G CN 110. In some examples, the SBA IMS network 114 a lightweight HTTP/Representational State Transfer (REST) protocol rather than a SIP application layer protocol as utilized by the legacy IMS network 118. The SBA IMS network 114 may host NFs not illustrated in FIG. 2 such that the SBA IMS network 114 may host multiple services. Further, services and NFs exposed by the SBA IMS network 114 may be consumed by SBA NF, whether the SBA NF.

As illustrated, according to some configurations, different NFs, such as NFs 202, 204, 206, 208, 212, 214, 216, 220, 222, 224, 226, 228, 230, 232, 234, 236, 238, 240, 242, 244, and 246, are connected together using a common API which may be referred to herein as a service-based interface (SBI). For instance, the SBI for MNRF 232 is Nmnrf 248. Similar interfaces exist for the other NFs. As discussed above, a NF service can directly access other NF services without having to pass through another node. In some configurations, a network repository function may be utilized as a discovery mechanism for identifying available NF services. Various NFs associated with the SBA IMS network 114 may indicate capabilities during a discovery procedure to the Multimedia Network Repository Function (MNRF) 232 associated with the SBA IMS network 114. The NFs may further implement network function registration.

Figure 3:
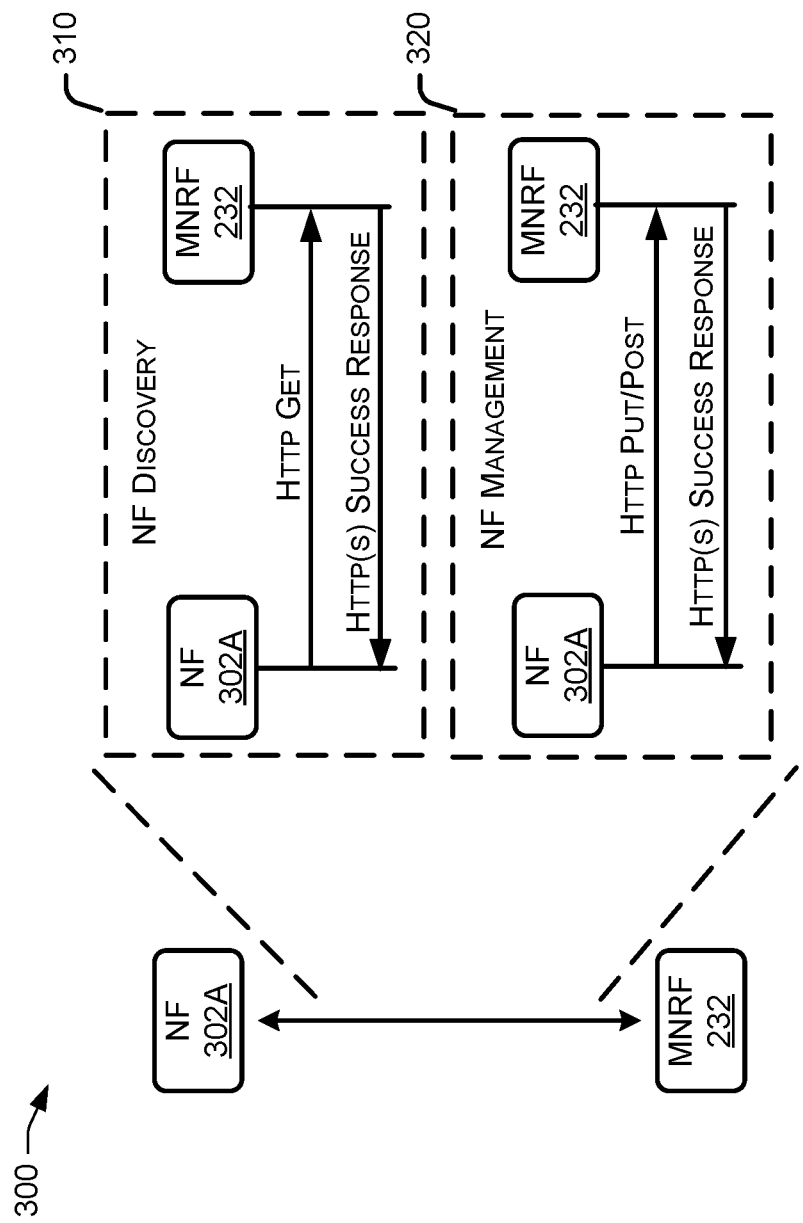
FIG. 3 is a block diagram showing an illustrative environment illustrating a Network Function (NF) discover service and NF management service.

Turning to FIG. 3, the MNRF 232 may implement a NF Discovery service 310 for a NF to discover other NFs. In some cases, the MNRF 232 may be configured to allow NFs to discover other NFs known/registered to the MNRF 232. For example, NF 302A may query MNRF 232, and/or possibly another node, to discover one or more available NFs provided by an NF.

In some implementations, the MNRF 232 may further implement an NF Management service 320. The MNRF 232 may allow a NF to register/de-register itself with the MNRF 232 and provide update service capabilities.

According to some configurations, the MNRF 232 may be configured to provide functionality associated with an authentication service. Using the authentication service, the MNRF 232 may allocate an authentication token to an NF during registration for added security. If a token grant mechanism is used, once allocated, any further actions by a NF (e.g., update, delete etc.) may utilize the MNRF 232 to validate against the allocated token.

Returning to FIG. 2, in some examples, during 5G registration, network devices/terminals, such as UE 106, depending on capabilities and operator settings, may receive IMS access gateway information for establishing IMS sessions. The information may be received from an access gateway function in the SBA IMS network. As illustrated in FIG. 2, the access gateway function may be referred to as the Multimedia Access Gateway Function (MAGF) 236. In some configurations, the MAGF 236 can be a simplified HTTP based access network function and act as entry point into the SBA IMS network 114. In some cases, the MAGF 236 may replace the existing IMS SIP access gateway (P-CSCF).

After 5G CN authentication and registration, network devices/terminals, such as UE 106, may implement HTTP-based IMS authentication, registration, and authorization for IMS services. Network access can be granted at a service level, where a device/terminal is individually authenticated for each service it needs to access. In some cases, network access can be granted at a group level (Service Group) against a list of services which can be authenticated and authorized based on a single HTTP request indicating the services to be accessed. An implementation strategy (e.g., service-level implementation or group-level implementation) can depend on a service provider's preference and/or a device manufacturer's preference.

In various implementations, upon receiving a network access request from an SBA IMS device/terminal, such as from UE 106, the MAGF 236 may inspect the incoming HTTP message for security parameters and service(s) being requested. Based on a configuration, the MAGF 236 may invoke a Multimedia Authentication Function (MAUF) 238.

The MAUF 238 may provide authentication and authorization services at a service level by generating authorization code(s) and access token(s) to enable service access. These authorization code(s) and access token(s) may be used by the network devices/terminals and IMS services intercommunication, respectively.

Following successful authentication and authorization, access to an IMS service may be granted. In some cases, during a transition from a legacy IMS network 118 to an SBA IMS network 114, network devices/terminals may include dual stack (SIP as well as HTTP) capabilities to work with non-SBA IMS networks.

In various examples, the MAGF 236 and MAUF 238 can be implemented as separated, collocated, or included within a single NF, thereby exposing authorization and access services. Whether the MAGF 236 and MAUF 238 are separated, or collocated may depend on a service provider's preference, an equipment vendor's preference, and/or some other consideration.

Following security procedures implementation, IMS devices/terminals, such as UE 106, may register with the SBA IMS network 114. In some cases, registration can either be part of the aforementioned authorization procedures or an independent method. According to some configurations, devices, such as UE 106, can register for a service (e.g., voice) or multiple services (e.g., voice, video, and text) in the same process.

Various implementations also relate to session routing. In an SBA IMS network 114, a Multimedia Session Routing Function (MSRF) 240 may provide routing services for multimedia session types (e.g., voice, video etc.) which includes end user determination (e.g., user registered within SBA IMS vs anchored in non IMS domain).

In addition, a Multimedia Application Function (MAF) 242 may be included in the SBA IMS network 114. The MAF 242 may expose various services to accept multimedia requests and apply configured/allowed services to these sessions. In some configurations, the MAF 242 is configured to handle at least some Multimedia Telephony (MMTel) services such as, but not limited to voice, video, chat, messaging, file transfer, multi-party calling, and 3rd party supplementary services (call forwarding, caller identification, short code dialing etc.). In some examples, the MAF 242 can handle at least one other IMS service, such as Rich Communication Service (RCS) messaging, presence, address book services, and the like.

Various multimedia registration sessions may be redirected to the MSRF 240 which can discover the MAF 242 (hosting the multimedia service) via the MNRF 232 (NF discovery procedure prescribed above) and route the session towards it. In various implementations, the MAF 242 uploads the constructed profile to a Multimedia Storage Function (MSTF) 230, so any MAF 242 instance may be able to handle multimedia sessions related to a given IMS device/terminal. The MAF 242 may discover the 5G UDM 226 through MNRF 232 interworking with the 5G NRF 222 and download the user profile. In some cases, the MSRF 240 can be defined statically on a MAGF 236 or may follow NF discovery procedures as discussed above.

Active multimedia sessions may follow similar methods to those described herein, in order to discover the MAF 242 which can apply the provisioned multimedia services. Once services are applied, sessions can be handed over to the MSRF 240 for handling/routing/termination. In cases in which the MAF 242 is unaware of the incoming session user (e.g., the user is hosted by another MAF 242 instance), the MAF 242 can discover the MSTF 230 to obtain the profile constructed and uploaded during registration. For users that have fallen off the SBA IMS network 114, the MAF 242 can attempt a profile recovery mechanism where a default profile can be created. Accordingly, session handling by the SBA IMS network 114 can continue.

In some examples, the MSTF 230 may provide storage services for ephemeral as well as persistent storage use cases. Several tiers may be constructed in terms of data availability and retrieval/access class as per operator requirements. In some cases, at least one of a user profile, registration state, call state, provisioning info, billing info such as Call Data Records (CDRs), Key Performance Indicators (KPIs) for Performance Management (PM), or alarming info for Fault Management (FM) can be stored at the MSTF 230.

In some implementations, a Multimedia Management Function (MMF) 246 can provide various (e.g., all) Operations, Administration and Management (OAM) services for an SBA IMS network 114. The MMF 246 may interact with the MSTF 230. In some cases, the MMF 246 can utilize operations and maintenance data (e.g., Performance Management (PM), Fault Management (FM), etc.) stored at the MMF 246 for illustration purposes and can act as a gateway towards network operator or 3rd party systems which utilize this data (e.g., billing). The MMF 246 may also provide service assurance capabilities and interwork with open-source/standard defined orchestration functions (e.g., Open Networking Automation Platform (ONAP)/European Telecommunications Standards Institute (ETSI) Network Functions Virtualization (NFV)).

According to some configurations, the SBA IMS network 114 connects to one or more other networks, such as the SIP based legacy IMS network 118. In some examples, a Multimedia Interworking Function (MIF) 244 may allow interconnectivity between the SBA IMS network 114 and the legacy IMS network 118, as well as non-IMS 3GPP networks (e.g., Public Switched Telephone Network (PSTN), 3G, etc.). The end user determination service in the MSFR 240 briefly discussed above may invoke the MIF 244 to handle calls destined for users outside the SBA IMS network 114. The MIF 244 can act as a back-to-back user agent.

According to some examples, the MIF 244 may interwork between SIP and HTTP. In some configurations, the MIF 244 may also anchor the user plane for these sessions and offer a transcoding service for sessions between the SBA IMS network 114 and the legacy IMS network 118 and/or other networks. In addition, the MIF 244 can expose a service capable of breaking out sessions towards circuit switched (PSTN, 3G) networks.

To handle media within the SBA IMS network 114, a Multimedia User Plane Function (MUPF) 234, that may be similar to the UPF 214, can be included in the SBA IMS network 114. The MUPF 234 may offer services for handling various (e.g., some/all) media/codec as well as transcoding within the SBA IMS network 114. The MUPF 234 may also expose services to anchor multimedia (e.g., voice, text, 3PCC, etc.) sessions. The MUPF 234 may additionally support supplementary services, such as any of announcements, caller tunes, and voicemail. The MSTF 230 may also store various (e.g., all) media related to said supplementary services. In certain implementations, the MUPF 234 can interact with the MSTF 230 as needed for data retrieval (e.g., playback).

Various configurations relate to seamless connectivity. In some cases, a 5G CN 110 and the SBA IMS network 114 can interact seamlessly via internetwork service discovery. As an example, the MNRF 232 can be utilized to discover the 5G CN Charging Function (CHF) 216 through the MNRF 232 and NRF interconnection, thereby offering a single platform to conduct charging across the entire network (e.g., data and multimedia). Similarly, 5G UDM 226 can be accessed by IMS NFs for user profile/provisioning needs, or specifically, in terminating multimedia session scenarios for access domain selection by determining user registration is in 5G IMS or legacy VoLTE network. Accordingly, various (e.g., any) IMS NFs can discover and utilize services of 5G CN NFs, and vice versa, as needed.

The AMF 208 connects to UE 106 and gNb 218 and manages UE related functions. In some examples, access and mobility functions are performed by AMF 208. The PCF 206 corresponds to policy and charging rule control function (PCRF) as included in legacy IMS networks. The AF 204 performs a role of an application server and may interact with a 3GPP core network in order to provide services.

Figure 4:
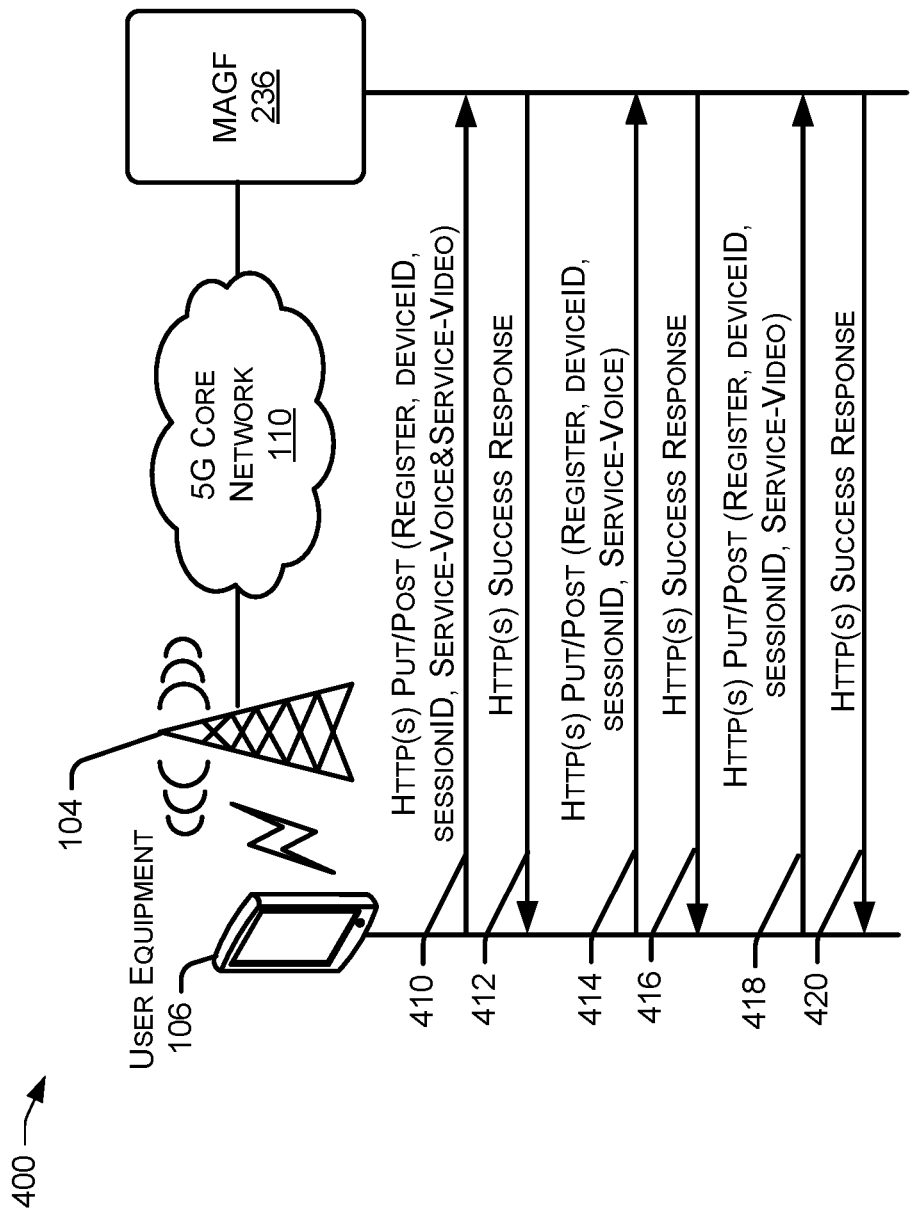
FIG. 4 is a diagram of an illustrative environment showing signaling between user equipment and a Multimedia Access Gateway Function (MAGF) that is located within an SBA IMS network.

FIG. 4 is a diagram of an illustrative environment 400 showing signaling between user equipment 106 and a Multimedia Access Gateway Function (MAGF) 236 that is located within an SBA IMS network. As illustrated, environment 400 shows UE 106, cell 104, 5G CN 110, and MAGF 236.

As discussed above, MAGF 236 may be located in the SBA IMS network 114. In some configurations, the MAGF 236 can be a simplified HTTP based access NF and act as entry point into the SBA IMS network 114.

After 5G CN authentication and registration, UE 106 is illustrated as providing an HTTP message at 410 to register with SBA IMS network 114 via the MAGF 236, the MAGF 236 may inspect the incoming HTTP message for security parameters and service(s) being requested. In this example, the message at 410 requests that UE 106 be registered for voice service and video service. In response to receiving message 410, the MAGF 236 registers the UE 106, and authorizes the UE 106 for voice and video services. The MAGF 236 also provides message 412 to the UE 106 indicating success.

At 414, the UE 106 requests to register for voice service. In response to receiving the request from UE 106, the MAGF 236 registers the UE 106, and authorizes the UE 106 for voice service. At 416, the MAGF 236 transmits a message to the UE 106 indicating success.

At 418, the UE 106 requests to register for video service. In response to receiving the request from UE 106, the MAGF 236 registers the UE 106, and authorizes the UE 106 for video service. At 420, the MAGF 236 transmits a message to the UE 106 indicating success.

In various implementations, upon receiving a network access request from an SBA IMS device/terminal, such as from UE 106, the MAGF 236 may inspect the incoming HTTP message for security parameters and service(s) being requested. Based on a configuration, the MAGF 236 may invoke a Multimedia Authentication Function (MAUF) 238.

Figure 5:
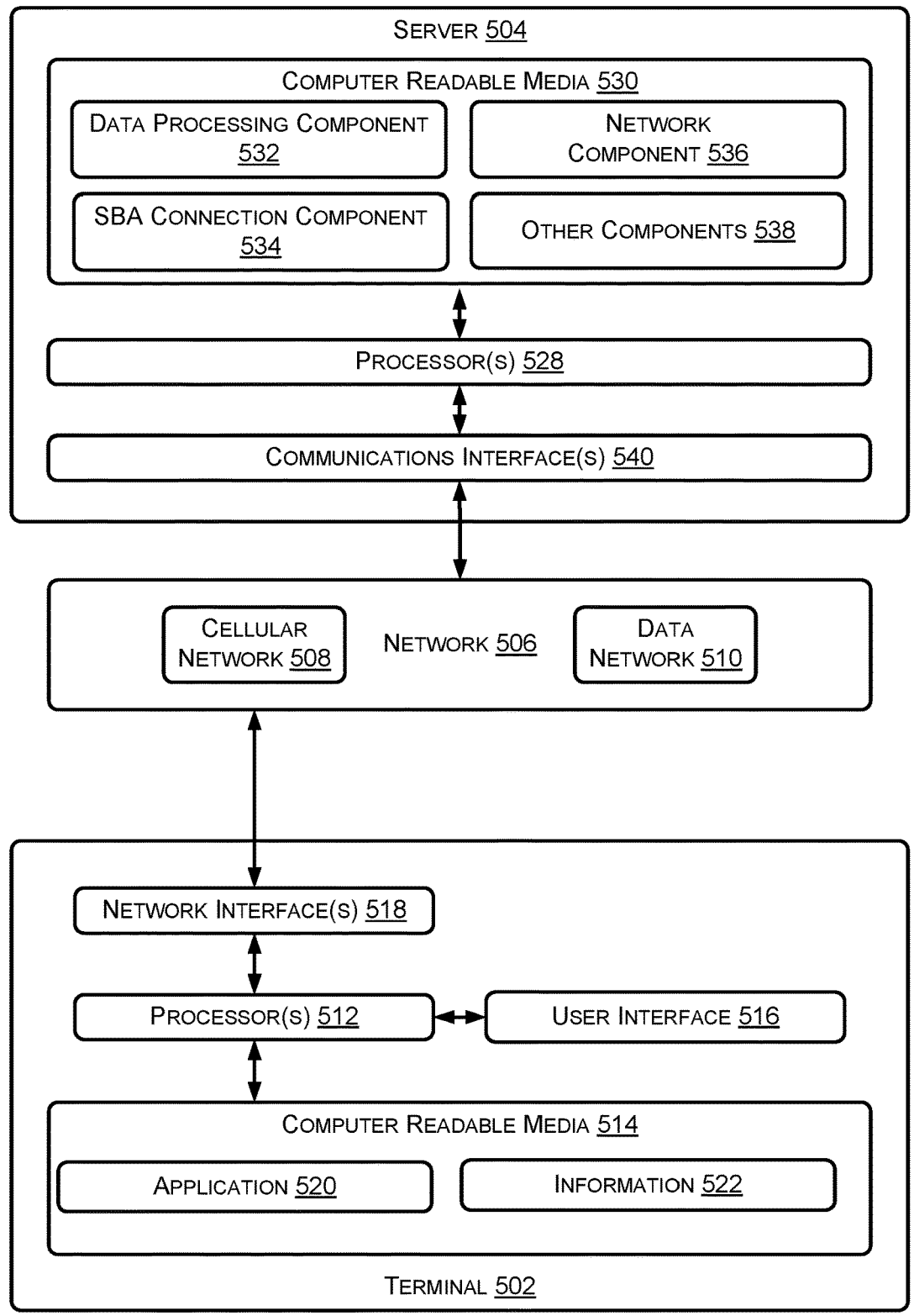
FIG. 5 is a block diagram illustrating a system that includes one or more components for utilizing an SBA IMS network.

FIG. 5 is a block diagram illustrating a system 500 that includes one or more components for utilizing an SBA IMS network 114, according to some implementations. The system 500 includes a terminal 502, which can represent a UE 106, or another computing device, coupled to a server 504, via a network 506. The server 504 can represent a computing device, such as one or more of the servers within the access network 102, the 5G CN 110, SBA IMS network 114, and/or some other computing device. The network 506 can represent network 110, 114, 118 and/or access network 102, or some other network.

The network 506 can include one or more networks, such as a cellular network 508 and a data network 510. The network 506 can include one or more core network(s) connected to terminal(s) via one or more access network(s). Example access networks include LTE, WIFI, GSM Enhanced Data Rates for GSM Evolution (EDGE) Radio Access Network (GERAN), UTRAN, and other cellular access networks. Message transmission, reception, fallback, and deduplication as described herein can be performed, e.g., via 3G, 4G, 5G, WIFI, or other networks.

The cellular network 508 can provide wide-area wireless coverage using a technology such as GSM, Code Division Multiple Access (CDMA), UMTS, LTE, NR, or the like. Example networks include Time Division Multiple Access (TDMA), Evolution-Data Optimized (EVDO), Advanced LTE (LTE+), Generic Access Network (GAN), Unlicensed Mobile Access (UMA), Orthogonal Frequency Division Multiple Access (OFDM), GPRS, EDGE, Advanced Mobile Phone System (AMPS), High Speed Packet Access (HSPA), evolved HSPA (HSPA+), VoIP, VoLTE, IEEE 802.1x protocols, wireless microwave access (WIMAX), WIFI, and/or any future IP-based network technology or evolution of an existing IP-based network technology. Communications between the server 504 and terminals such as the terminal 502 can additionally or alternatively be performed using other technologies, such as wired (Plain Old Telephone Service, POTS, or PSTN lines), optical (e.g., Synchronous Optical NETwork, SONET) technologies, and the like.

The data network 510 can include various types of networks for transmitting and receiving data (e.g., data packets), including networks using technologies such as WIFI, IEEE 802.15.1 ("BLUETOOTH"), Asynchronous Transfer Mode (ATM), WIMAX, and other network technologies, e.g., configured to transport IP packets. In some examples, the server 504 includes or is communicatively connected with an IWF or other device bridging networks, e.g., LTE, 3G, and POTS networks. In some examples, the server 504 can bridge SS7 traffic from the PSTN into the network 506, e.g., permitting PSTN customers to place calls to cellular customers and vice versa.

In some examples, the cellular network 508 and the data network 510 can carry voice or data. For example, the data network 510 can carry voice traffic using VoIP or other technologies as well as data traffic, or the cellular network 508 can carry data packets using HSPA, LTE, or other technologies as well as voice traffic. Some cellular networks 508 carry both data and voice in a PS format. For example, many LTE networks carry voice traffic in data packets according to the VoLTE standard. Various examples herein provide origination and termination of, e.g., carrier-grade voice calls on, e.g., networks 506 using CS transports or mixed VoLTE/5G transports, or on terminals 502 including OEM handsets and non-OEM handsets.

The terminal 502 can be or include a wireless phone, a wired phone, a tablet computer, a laptop computer, a wristwatch, or other type of terminal. The terminal 502 can include one or more processors 512, e.g., one or more processor devices such as microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs), and one or more computer readable media (CRM) 514, such as memory (e.g., random access memory (RAM), solid state drives (SSDs), or the like), disk drives (e.g., platter-based hard drives), another type of computer-readable media, or any combination thereof. The CRM or other memory of terminal 502 can hold a datastore, e.g., an SQL or NoSQL database, a graph database, a BLOB, or another collection of data. The terminal 502 can further include a user interface (UI) 516, e.g., including an electronic display device, a speaker, a vibration unit, a touchscreen, or other devices for presenting information to a user and receiving commands from the user. The terminal 502 can further include one or more network interface(s) 518 configured to selectively communicate (wired or wirelessly) via the network 506, e.g., via an access network 122.

The CRM 514 can be used to store data and to store instructions that are executable by the processors 512 to perform various functions as described herein. The CRM 514 can store various types of instructions and data, such as an operating system, device drivers, etc. The processor-executable instructions can be executed by the processors 512 to perform the various functions described herein.

The CRM 514 can be or include computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, non-transitory medium which can be used to store the desired information and which can be accessed by the processors 512. Tangible computer-readable media can include volatile and nonvolatile, removable and non-removable media implemented in any method or technology for storage of information, such as computer readable instructions, data structures, program components, or other data.

The CRM 514 can include processor-executable instructions of an application 520. The CRM 514 can store information 522 identifying the terminal 502. The information 522 can include, e.g., an IMEI, an IMSI identifying the subscriber using terminal 502, or other information discussed above. The CRM 514 can additionally or alternatively store credentials (omitted for brevity) used for access, e.g., to IMS or RCS services.

The server 504 can include one or more processors 528 and one or more CRM 530. The CRM 530 can be used to store processor-executable instructions of a data processing component 532, a SBA connection component 534 which may configured to determine if a request is in the form of a stateless protocol intended for the SBA IMS network 114, a network component 536 that is configured to perform one or more network operations, as well as one or more other components 538. The processor-executable instructions can be executed by the one or more processors 528 to perform various functions described herein.

In some examples, server 504 can communicate with (e.g., is communicatively connectable with) terminal 502 or other devices via one or more communications interface(s) 540, e.g., network transceivers for wired or wireless networks, or memory interfaces. Example communications interface(s) 540 can include ETHERNET or FIBRE CHANNEL transceivers, WIFI radios, or DDR memory-bus controllers (e.g., for DMA transfers to a network card installed in a physical server 504).

In some examples, processor 512 and, if required, CRM 514, are referred to for brevity herein as a "control unit." For example, a control unit can include a CPU or DSP and instructions executable by that CPU or DSP to cause that CPU or DSP to perform functions described herein. Additionally, or alternatively, a control unit can include an ASIC, FPGA, or other logic device(s) wired (physically or via blown fuses or logic-cell configuration data) to perform functions described herein. Other examples of control units can include processor 528 and, if required, CRM 530.

Figure 6:
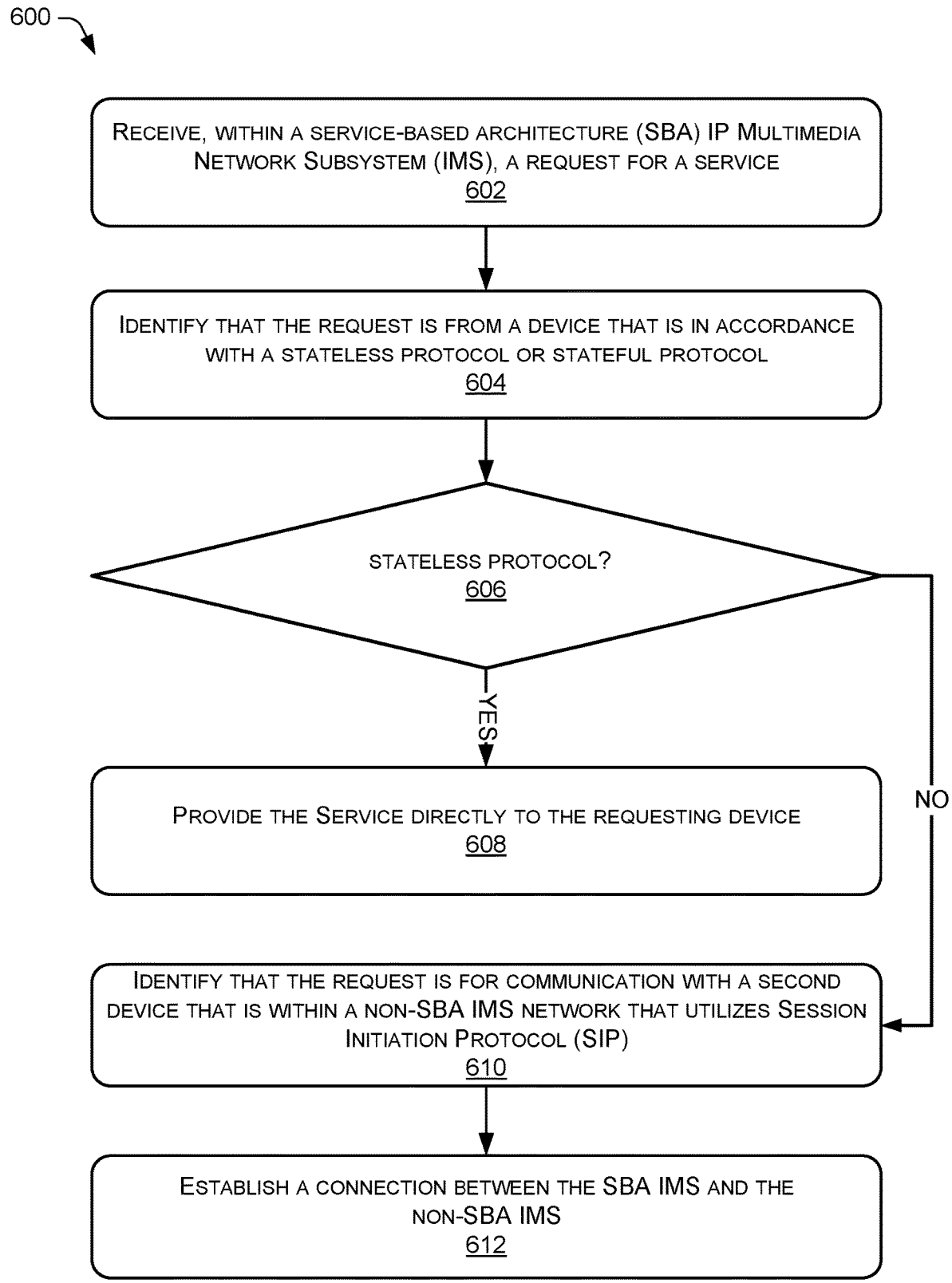
FIG. 6 is a flow diagram of an example process that includes utilizing an SBA IMS network, according to some implementations.

FIG. 6 illustrates an example process. The example process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 6 illustrates an example process that includes utilizing an SBA IMS network 114, according to some implementations. The process includes, at 602, receiving, within an SBA IMS network 114, a request for a service, such as a NF. For example, a node 116 within the SBA IMS network 114 may receive a request from UE 106, or from some other node, such as from one or more of the nodes 112 illustrated in 5G CN 110.

At 604, the node receiving the request, or some other node (e.g., one or more of the nodes 112 and/or 116), identifies that the request is from a device, such as UE 106, that is accordance with a stateless protocol or a stateful protocol. As discussed above, the request may follow a stateless HTTP (or some other stateless protocol), or may follow SIP, such as in a legacy IMS network 118.

At 606, a determination is made as to whether the request follows a stateless protocol. When the request follows a stateless protocol as utilized by the SBA IMS network 114, the process 600 flows to 608. When the request does not follow a stateless protocol and follows a stateful protocol such as utilized by the legacy IMS network 118, the process 600 flows to 610.

At 608, the service is provided directly to the requesting node. For example, the node receiving the request in the SBA IMS network 114 may provide the requested NF to the UE 106.

At 610, the node receiving the request, or some other node, identifies that the request is for communication with a second device that is within a non-SBA IMS network, such as the legacy IMS network 118 that utilizes SIP.

At 612, a node within the SBA IMS network 114, such as MIF 244, establishes a connection between the SBA IMS network 114 and the non-SBA IMS network, such as the legacy IMS network 118.

Although the subject matter has been described in language specific to structural features and/or methodological acts, it is to be understood that the subject matter described in this disclosure is not necessarily limited to any of the specific features or acts described. Rather, the specific features and acts are disclosed as examples and embodiments of the present disclosure.

What is claimed is:

1. A device comprising:
   one or more processors;
   at least one memory; and
   one or more components stored in the at least one memory and executable by the one or more processors to perform operations comprising:
      receiving a request for a service, wherein the device is configured to communicate using a stateless protocol with a second device;

identifying that the request is from the second device and that the request is in accordance with the stateless protocol; and providing the service from the device directly to the second device, wherein the device is a node within a service-based architecture (SBA) IP Multimedia Network Subsystem (IMS), and wherein the SBA IMS is coupled to a non-SBA IMS that utilizes a Session Initiation Protocol (SIP), wherein the SBA IMS is configured to communicate with the non-SBA IMS, and wherein the SBA IMS implements at least some services also implemented by the non-SBA IMS.

2. The device of claim 1, wherein the second device is within a 5G core network that is coupled to the SBA IMS.

3. The device of claim 1, wherein the stateless protocol is a HyperText Transfer Protocol (HTTP).

4. The device of claim 1, further comprising:
identifying that the request is for communication with a third device within the non-SBA IMS; and
establishing a connection between the SBA IMS and the non-SBA IMS.

5. The device of claim 1, wherein the second device is configured to communicate directly with a plurality of devices within the SBA IMS.

6. The device of claim 1, wherein the device is further configured to communicate directly with a plurality of nodes within a 5G core network.

7. A computer-implemented method performed by one or more processors configured with specific instructions, the computer-implemented method comprising:
receiving, at a first node within a service-based architecture (SBA) IP Multimedia Network Subsystem (IMS), a request for a service, wherein the SBA IMS includes the first node that is configured to communicate using a stateless protocol with a second node;
identifying that the request is from the second node and that the request is in accordance with the stateless protocol; and
providing the service from the first node directly to the second node,
wherein the SBA IMS is coupled to a non-SBA IMS that utilizes a Session Initiation Protocol (SIP), wherein the SBA IMS is configured to communicate with the non-SBA IMS, and wherein the SBA IMS implements at least some services also implemented by the non-SBA IMS.

8. The computer-implemented method of claim 7, wherein the second node is within a 5G core network that is coupled to the SBA IMS.

9. The computer-implemented method of claim 7, wherein the stateless protocol is a HyperText Transfer Protocol (HTTP).

10. The computer-implemented method of claim 7, further comprising:
identifying that the request is for communication with a third node within the non-SBA IMS; and
establishing a connection between the SBA IMS and the non-SBA IMS.

11. The computer-implemented method of claim 7, wherein the second node is configured to communicate directly with a plurality of nodes within the SBA IMS.

12. The computer-implemented method of claim 7, wherein the first node is configured to expose one or more of a NF Discovery service or a NF Management service.

13. The computer-implemented method of claim 7, wherein a plurality of nodes within the SBA IMS are configured to communicate directly with a second plurality of nodes within a 5G core network.

14. A non-transitory computer-readable medium storing instructions that, when executed, cause one or more processors to perform operations, comprising
receiving, at a first node within a service-based architecture (SBA) IP Multimedia Network Subsystem (IMS), a request for a service, wherein the SBA IMS includes the first node that is configured to communicate using a stateless protocol with a second node;
identifying that the request is from the second node and that the request is in accordance with the stateless protocol; and
providing the service from the first node directly to the second node,
wherein the SBA IMS is coupled to a non-SBA IMS that utilizes a Session Initiation Protocol (SIP), wherein the SBA IMS is configured to communicate with the non-SBA IMS, and wherein the SBA IMS implements at least some services also implemented by the non-SBA IMS.

15. The non-transitory computer-readable medium of claim 14, wherein the second node is within a 5G core network that is coupled to the SBA IMS.

16. The non-transitory computer-readable medium of claim 14, wherein the stateless protocol is a HyperText Transfer Protocol (HTTP).

17. The non-transitory computer-readable medium of claim 14, the operations further comprising:
identifying that the request is for communication with a third node within the non-SBA IMS; and
establishing a connection between the SBA IMS and the non-SBA IMS.

* * * * *